(12) United States Patent
Venca et al.

(10) Patent No.: US 7,375,909 B2
(45) Date of Patent: May 20, 2008

(54) WRITE DRIVER WITH POWER OPTIMIZATION AND INTERCONNECT IMPEDANCE MATCHING

(75) Inventors: Alessandro Venca, Tortona (IT); Roberto Alini, Dublin, CA (US); Baris Posat, Burlingame, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 418 days.

(21) Appl. No.: 10/824,096

(22) Filed: Apr. 14, 2004

(65) Prior Publication Data

US 2005/0231843 A1    Oct. 20, 2005

(51) Int. Cl.
G11B 5/09    (2006.01)

(52) U.S. Cl. ............................. 360/46; 360/65; 360/67; 360/68

(58) Field of Classification Search ............... None
See application file for complete search history.

(56) References Cited

U.S. PATENT DOCUMENTS

| | | | |
|---|---|---|---|
| 5,581,455 A | 12/1996 | Rossi et al. | |
| 5,612,828 A | 3/1997 | Brannon et al. | |
| 5,841,603 A | 11/1998 | Ramalho et al. | |
| 5,914,867 A | 6/1999 | Pascucci | |
| 5,952,851 A | 9/1999 | Yuen | |
| 6,121,800 A | 9/2000 | Leighton et al. | |
| 6,166,869 A | 12/2000 | Pidutti et al. | |
| 6,201,653 B1* | 3/2001 | Contreras et al. | 360/46 |
| 6,204,654 B1 | 3/2001 | Miranda et al. | |
| 6,236,246 B1 | 5/2001 | Leighton et al. | |
| 6,236,247 B1 | 5/2001 | Ngo | |
| 6,275,347 B1 | 8/2001 | Ngo et al. | |
| 6,307,695 B1 | 10/2001 | Bhandari | |
| 6,512,645 B1 | 1/2003 | Patti | |
| 6,512,646 B1 | 1/2003 | Leighton et al. | |
| 6,532,123 B1 | 3/2003 | Veenstra et al. | |
| 6,545,514 B2 | 4/2003 | Barrow | |
| 6,671,113 B2* | 12/2003 | Klaassen et al. | 360/46 |
| 6,683,487 B2 | 1/2004 | Takeuchi et al. | |
| 6,744,578 B1* | 6/2004 | Bishop | 360/31 |
| 6,794,880 B2 | 9/2004 | Tucker | |
| 6,831,800 B2 | 12/2004 | Ranmuthu | |
| 6,879,455 B2* | 4/2005 | Ngo et al. | 360/68 |
| 6,885,225 B2 | 4/2005 | Ohmichi et al. | |
| 6,917,484 B2 | 7/2005 | Ranmuthu | |
| 7,035,028 B2* | 4/2006 | Venca et al. | 360/46 |
| 2002/0186578 A1 | 12/2002 | Kim | |
| 2003/0081339 A1 | 5/2003 | Barnett | |

(Continued)

Primary Examiner—Hoa Thi Nguyen
Assistant Examiner—Dismery Mercedes
(74) Attorney, Agent, or Firm—Lisa K. Jorgenson; William J. Kubida

(57) ABSTRACT

A write driver for driving a write current through a write head connected to the write head by an interconnect or flexible transmission line. The write driver includes a circuit matching an output impedance of the write driver to the odd characteristic impedance of the interconnect and includes a current source generating a current output to the write head. The write driver provides a current amplification effect as the output current is half the write current driven through the write coil. The impedance matching circuit includes an output resistor with a resistance equal to the odd characteristic impedance of the interconnect. The write driver includes a voltage source that operates to maintain a voltage drop of zero on the output resistor during the initial period of twice the transmission delay of the interconnect.

22 Claims, 8 Drawing Sheets

U.S. PATENT DOCUMENTS

| | | |
|---|---|---|
| 2003/0090828 A1 | 5/2003 | Venca |
| 2003/0142432 A1 | 7/2003 | Yoshizawa et al. |
| 2003/0189447 A1 | 10/2003 | Price |
| 2003/0234996 A1 | 12/2003 | Ngo |
| 2004/0032684 A1 | 2/2004 | Leighton et al. |
| 2004/0196582 A1* | 10/2004 | VanEaton et al. ............. 360/46 |
| 2005/0174668 A1 | 8/2005 | Fang et al. |

* cited by examiner

WRITE DRIVER WITH POWER OPTIMIZATION AND INTERCONNECT IMPEDANCE MATCHING

BACKGROUND OF THE INVENTION

1. Field of the Invention

The present invention relates, in general, to hard disk drives and magneto resistive data storage devices and systems, and, more particularly, to a write driver, and associated method, utilizing a write driver circuit to switch a current into a low impedance head connected through a transmission line to the write driver. The write driver circuit is configured to provide highly optimized power consumption and improved impedance matching.

2. Relevant Background

The demand for improved data storage techniques and systems continues to rapidly grow. Hard disk drives utilizing magneto resistive (MR) heads to read and write data onto one or more spinning magnetic platters or disks are one of the more important and wide spread devices in the data storage industry. Hard disk drives may be used in many applications, including enterprise computer systems, personal computers, set top boxes, audio, video, or television applications, and many other large and small computer devices. Many applications are still being developed, and the uses for hard disk drives are expected to increase.

Hard disk drives store binary encoded information as regions of magnetic flux on a media having a magnetic surface coating. It is desirable that these magnetic regions be encoded on the disk as densely as practical, so that a maximum amount of information may be stored. Disk and tape drive suppliers continue to increase areal densities, or the number of data bits per square inch, to meet the increasing demand for storage at competitive pricing. However, increasing areal density requires the write mechanism to produce smaller recorded patterns on the disk. Write head design and write driver design are key technologies needed to achieve these capacity increases.

The magnetic regions are created by passing current through a coil of a magnetic write head. Binary data can be encoded by switching the polarity of the current through a coil in the write head. The current in the write head coil is provided by a circuit in a write driver that is connected to the coil through a flexible transmission interconnect. The data rate (i.e., the rate at which bits can be written onto the media) is determined largely by the rate at which the current can be switched in the write head driver circuit. It is desirable to have a write driver circuit that quickly switches current to the desired polarity and magnitude to support high disk rotation speeds with small magnetic regions. Also, the driver circuit must raise the current amplitude to a level sufficient to ensure the flux generated by the write coil is adequate to saturate the magnetic media while limiting the current below levels that will result in "blooming" of the written magnetic region into adjacent regions of the media.

A conventional write driver circuit comprises an H-bridge configuration using four switches. In an H-bridge circuit, one leg of the bridge is always trying to drive current into the inductive load. In other words, the H-bridge is always coupling the power supply voltage onto one of the inductor nodes and ground to the other inductor node by appropriately activating the bridge switches. While there have been many improvements to conventional write driver circuits to enhance their performance, there are demands for improved performance. For example, many switching write driver circuits still are unable to achieve impedance matching to transmission interconnects and the lack of impedance matching results in pattern dependent distortion which limits the performance of the write circuitry. There are also continuing issues with the power required to operate or drive the write head with the write driver, with an increasing demand to provide higher current to the write head coil with less power.

FIGS. 1 and 2 illustrate two different techniques for driving current into a low impedance write head. The write circuitry 110, 210 are used to drive current or a current step, $\Delta I_{OUT}$, into write heads 116, 230, which are shown for simplicity as a short circuit. Each circuit 110, 210 includes a write driver 112, 212 for driving the head 116, 230 that is connected to the head 116, 230 through a transmission interconnect or electrical connection 114, 220 that is characterized by an odd characteristic impedance, $Z_{ODD}$, and a transmission delay, $T_D$, between the write driver 112, 212 and the head 116, 230. FIGS. 1 and 2 are drawn to show the write drive impedance conditions before the reflected signal that is generated on in the write head 116, 230 appears at the write driver 112, 212 side of the circuit 110, 210, which is typically twice the transmission delay or $2T_D$. The simplified circuits 110, 210 of FIGS. 1 and 2 allow the output current, $\Delta I_{OUT}$, the write driver output voltage, $\Delta V_{IN}$, and the power supplied by the write driver 112, 212 for the first $2T_D$ seconds after the transition to be calculated using well known equations governing the propagation of signals through a transmission line, e.g., the power consumption equation provided in the following paragraph. Also, the circuits 110, 210 include write driver generators that can be sized in order to have the same output current step, $\Delta I_{OUT}$, to facilitate comparison of the circuits 110, 210.

In circuit 110, the output impedance of the write driver 112 is much higher, e.g., considered to be infinite for simplicity, than the impedance, $Z_{ODD}$, of the interconnect 114 during the transition. The circuit 110 provides a technique for driving current with current source 113 through write head 116 that has the advantage of generating a current amplification effect on the load or head side because the output current step, $\Delta I_{OUT}$, is twice the source current step, $\Delta I_{IN}/2$. The amplification effect accounts for a gain in power of 2 or of 200 percent by the source for the first $2T_D$ seconds with respect to the circuit 210 of FIG. 2, with power consumption determined by the following:

$$\text{Power Consumption} = DV_{IN} \cdot DI_{IN} = DI_{IN}^2 \cdot Z_{ODD} = (DI_{OUT} \cdot Z_{ODD})/4$$

However, the circuit 110 does not address all of the concerns with write driver circuitry. The circuit 110 is problematic because the circuit 110 is not matched in the sense that the write driver 112 has output impedance that is much higher than the characteristic impedance of the transmission line 114. Due to this unmatched condition at the source side of the circuit 110, reflections that are generated by the write head 116 consequent to a transition are not terminated at the source side. Instead, the reflections continue to propagate even after twice the transmission delay, $2T_D$, which causes the undesirable result of an oscillating output response to the input step.

In circuit 210, the output impedance of the write driver 212 is set equal to the impedance of the transmission interconnect, $Z_{ODD}$, during the transition. The circuit 210 provides an advantage over the circuit 110 of FIG. 1 in that write driver 212 is impedance matched to the interconnect 220 via resistor 214. In this way, propagation of reflected waves is avoided when the current source 216 is used to drive the write head 230. The circuit 210 provides a clean output step, $\Delta I_{OUT}$, in response to the input step, $\Delta I_{IN}$, from current source 216. However, the circuit 210 does not provide any current amplification effect as is provided in the circuit 110 of FIG. 1, as the output current step, $\Delta I_{OUT}$, is equal to the source current step, $\Delta I_{IN}$. As a result, during the period of twice the transmission delay, $2T_D$, after a transition, half of the current generated by the input source 216 flows away through the parallel path formed by the output impedance 214 of the write driver 212 and only half of the current is effectively launched into the line or interconnect 220, with power consumption determined by the following:

Power Consumption=$DV_{IN} \cdot DI_{IN} = (DI_{IN}^2 \cdot Z_{ODD})/2 = (DI_{OUT}^2 \cdot Z_{ODD})/2$ Hence, a need exists for a circuit for driving write heads in a hard disk drive (HDD) system that addresses the need for, and benefits associated with, matching the impedance of the write driver circuit with the impedance of interconnects with the write head and also with providing a desirable current amplification effect with a write driver circuit so as to improve or even optimize power supply by the write driver.

SUMMARY OF THE INVENTION

The present invention addresses the above problems by providing a method and associated circuitry or components for selectively driving a write current through a write head of a hard disk drive assembly with reduced power consumption and with little or no propagation of reflected waves from the write head. Generally, a write driver is connected to a write head via a transmission interconnect. The write driver is configured to provide both impedance matching with the interconnect and enhanced power usage. The write driver has an output impedance set equal to the odd characteristic impedance of the interconnect, such as by selection of an output resistor. The internal termination of the output resistor is driven by an equivalent voltage source such that the voltage drop across the output resistor is equal to zero during an initial period after the beginning of a transition equal to twice the transmission delay of the interconnect. A current source is provided that produces a source current step of about half the write current and as a result, the write head functions to generate a current amplification effect on the write head side or load side since in transmission the circuit is completely equivalent to the circuit 110 of FIG. 1. During operation, the voltage drop on the output resistor is made equal to zero, and no power is supplied by the voltage source for an initial period after a transition, i.e., twice the interconnect transmission delay. Hence, the write driver of the present invention is able to provide a gain in power of two while avoiding propagation of reflected waves to create a clean output step response to the step input to the write head since in reception the inventive circuit becomes matched with the interconnect showing an output impedance equal to $Z_{ODD}$.

More particularly, a write driver is provided for driving a write current through a coil of a write head. The write driver is connected to the write head by an interconnect or transmission line having an odd characteristic impedance. The write driver includes a circuit for matching an output impedance of the write driver to the odd characteristic impedance of the interconnect and also includes a step current source for generating a source current output to the write head. A current amplification effect is achieved by the write driver with the output source current being about half the write current driven through the write coil. The impedance matching circuit includes an output resistor with a resistance selected to be substantially equal with the odd characteristic impedance of the interconnect.

In some embodiments, the write driver includes a voltage source with a buffer having unity gain that is connected to an input of the output resistor. The voltage source may further include a transistor and a resistor both connected to an input of the buffer, with the resistor having a resistance scaled by a factor of the output resistance, i.e., the odd character impedance. The voltage source operates to maintain a voltage drop of zero on the output resistor during the initial period of twice the transmission delay of the interconnect. The current source in some embodiments includes a transistor to generate a pulsed current with an amplitude set by a current mirror connected to the transistor and by a reference current generator driving the current mirror.

DETAILED DESCRIPTION OF THE PREFERRED EMBODIMENTS

Briefly, the present invention is directed to a method, and associated circuitry and devices for switching current into a write head in a hard disk drive (HDD) system with both improved or optimized power consumption and impedance matching. The impedance matching is provided between a circuit in the write driver and an interconnect or transmission line connecting the write driver to the write head. By providing impedance matching, the method and circuitry of the invention is able to avoid propagation of reflected waves from the write head. A current source for the write driver is configured to provide a desired current amplification effect on the load or write head side that allows the write driver to be configured to provide no power for a period after each transition, i.e., for twice the delay in the transmission line or interconnect. In this manner, the method and circuitry of the invention provide a gain of two in power supplied by the write driver source.

Figure 3:
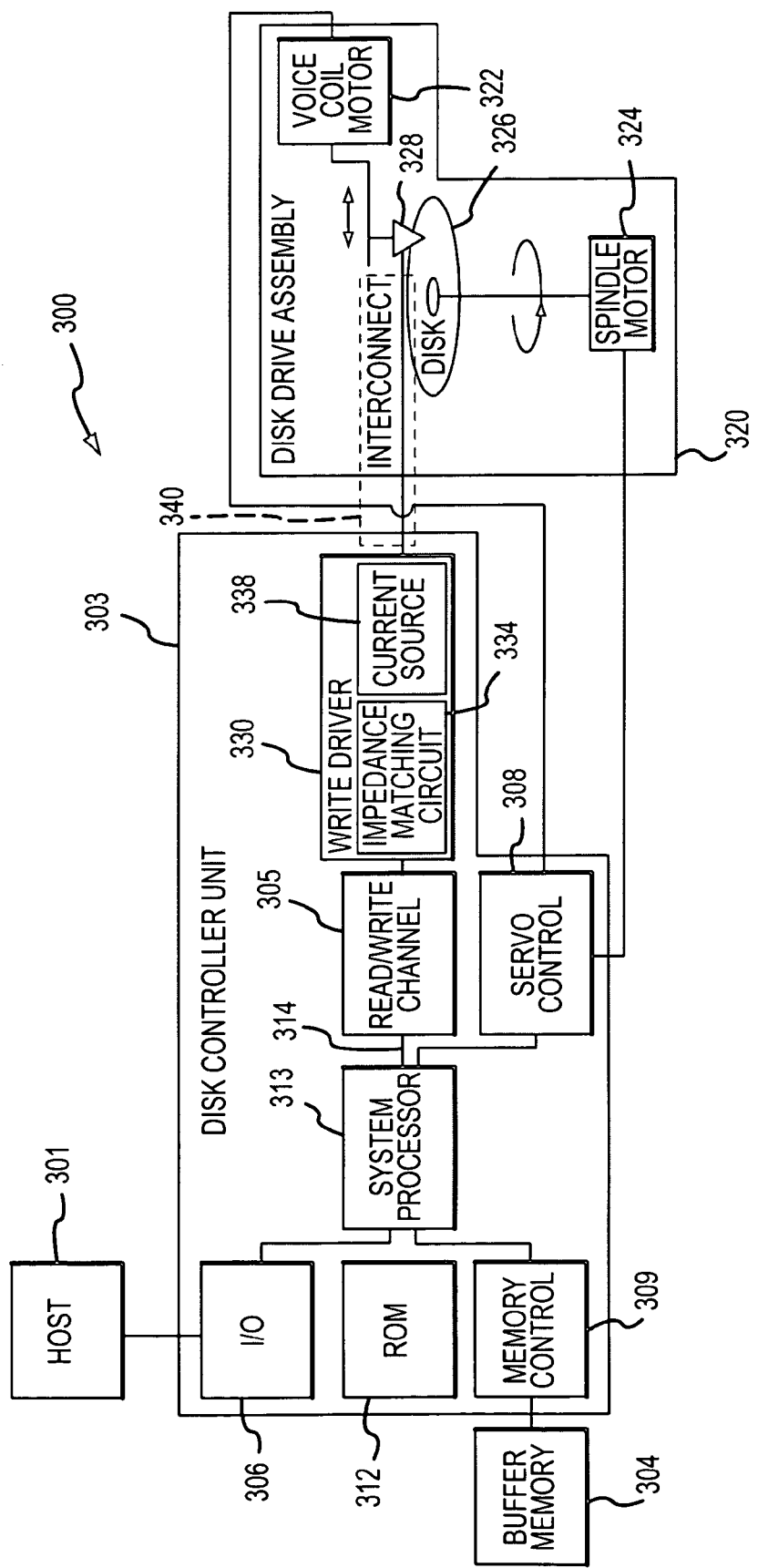
FIG. 3 illustrates in block diagram form a hard disk drive (HDD) system with a write driver comprising an impedance matching circuit and a current source according to the present invention providing impedance matching with an interconnect to a write head and providing current amplification to better optimize power of the write head.

FIG. 3 illustrates in simplified form a hard disk drive system 300 in which the present invention is embodied but it should be understood that the power optimization and impedance matching features of the invention can be used in most hard disk drive assemblies that utilize an impedance head 328 linked via an interconnect 340 to a write driver 330 and are not limited to use in the system illustrated. As shown, disk drive system 300 includes a system processor 313 processing requests and commands from a host computer 301 that directs drive system 300 to perform specific behavior involving disk drive assembly 320. Examples include reading and writing data to disk drive assembly 320, providing state information such as defect tables, error status, and the like. Disk controller unit 303 includes data processing capacity as well as memory in the form of ROM 312 and buffer memory 304 to generate responses to received commands and requests as controlled by memory control 309. The generated responses return data, state information, and/or error codes depending on the particular operation being performed.

Disk drive system 300 implements physical mass storage typically on a plurality of magnetic disks and read/write head electronics for transferring data with the disks. As shown, disk drive system 300 includes read channel hardware for preprocessing and amplifying data read from the magnetic media as well as a spin motor for spinning the disks, and voice coil motor (VCM) for positioning the read/write head electronics at specific locations with respect to the disk surface(s). Servo control 308 generates drive signals that control the VCM 322 and/or spindle motor 324. These drive signals are in the form of precision higher power signals that drive the motors directly.

Host 301 typically comprises a data processing device such as a personal computer, server, workstation or the like that requires access to bulk data storage capabilities of disk drive assembly 320. Host 301 sends write commands and data via controller 303 to write data onto the disk(s) 326 as well as read commands to retrieve previously written data from disks within disk drive assembly 320. The read and write commands are provided via the read/write channel 305. On both read and write operations, the data transmitted from the host 301 to the disk controller 303 includes an indication of a specific location or set of locations on the disk drive assembly 320 that contains the data that is to be accessed.

The data that is exchanged through disk controller 303 is typically buffered in buffer memory 304 that is accessible via memory controller 309 and subsequently transmitted to disk assembly 320 or host 301. Buffer memory 304 is used to overcome differences between the speed at which host 301 operates as compared to the speed at which disk assembly 320 operates. In place of or in addition to buffer memory 304, a cache memory may be implemented by appropriate changes (e.g., tag management, hit/miss detection, and the like) to memory controller 309. Servo control 308 regulates the spin speed of spindle motor 324 in response to commands from system processor 313. Although a head position control unit is often provided, the servo control 308 is shown to operate, e.g., through a voltage mode driver (not shown), to deliver controlled voltage signals in response to commands from system processor 313 to voice coil motor 322. These voltage signals cause voice coil motor unit 322 to move read/write head 328 into precision alignment with respect to the surfaces of disk 326.

Read/write channel circuit 305 communicates data and control information with the surface of disk 326. Control information such as servo control data, phase lock oscillator synchronization patterns, and servo bursts are encoded into portions of disk 326. This information is provided through read/write channel circuit 305 to system processor 313. System processor 313 uses this information to compute commands for servo control 308.

The read/write head 328 comprises an MR head that is used to both record user data to and read user data back from the disk 326. Recording data or writing by the head 328 is controlled in part by the write driver 330 that functions to drive a current through a coil in the head. In this regard, the write driver 330 of the system 300 is configured according to the invention to include a current source 338 that produces a current that is transmitted over a flexible transmission line or interconnect 340 to the head 328. As will be explained in detail with reference to FIGS. 4–11, the current source 338 and other circuitry of the write driver 330 are preferably adapted to provide a current amplification effect at the head 328 that when combined with no power consumption for a period after transition produces a significant gain, such as a gain of 2, in the output power of the write driver 330.

To control propagation of reflected waves from the head 328, the write driver 330 also is shown to include an impedance matching circuit 334 to better illustrate the concept of matching impedance of the write driver 330 to the impedance of the interconnect 340. In practice, the circuit 334 may be included in the voltage source circuit (or the power source may be considered part of the impedance matching circuit), with the important aspect being that the write driver 330 includes one or more components, such as resistors, that set the write driver 330 output impedance to the odd characteristic impedance of the interconnect 340 (where $Z_{ODD}=Z_O/2$). In other words, resistance of the driver 330 or $R_{OUT}$ is selected to be equal to $Z_{ODD}$ and power consumption for the write driver 330 can be determined with the equation of $(\Delta I_{OUT}^2 \cdot Z_{ODD})/4$ where $\Delta I_{OUT}$ is the current driven through the head 328.

A number of configurations can be used to practice the invention to provide both impedance matching and a current amplification effect in the write driver 330. However, before describing specific examples of how the write driver 330 with impedance matching 334 and a current amplification effect current source 338 can be implemented, it may be useful to illustrate a simplified write assembly illustrated similar to the prior art implementations of FIGS. 1 and 2 to better demonstrate the enhancements provided by the invention.

Figures 1, 2:
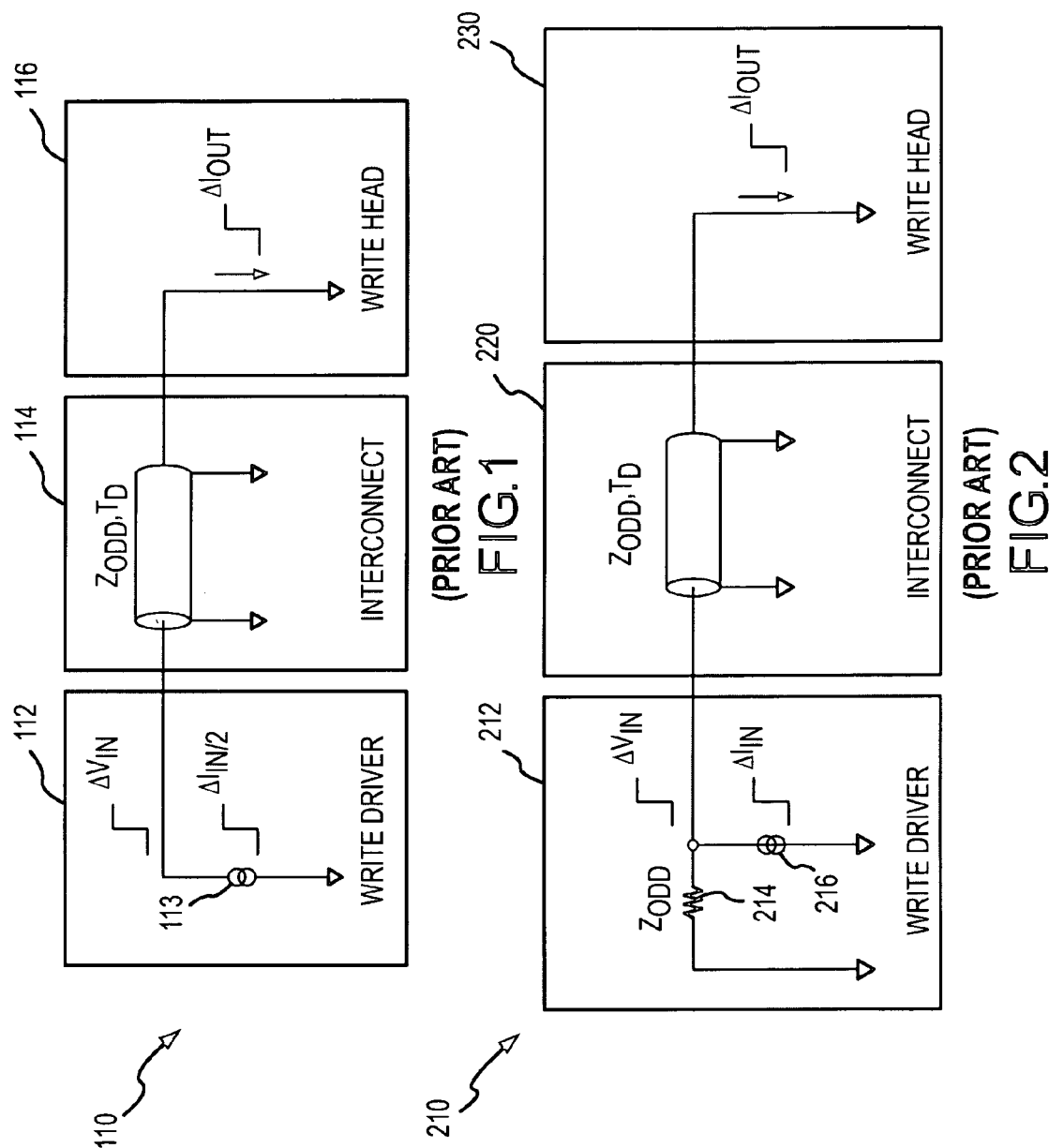
FIGS. 1 and 2 illustrate with simplified circuits two prior art write circuitry implemented to drive current through a write head in a hard disk drive.
Figure 4:
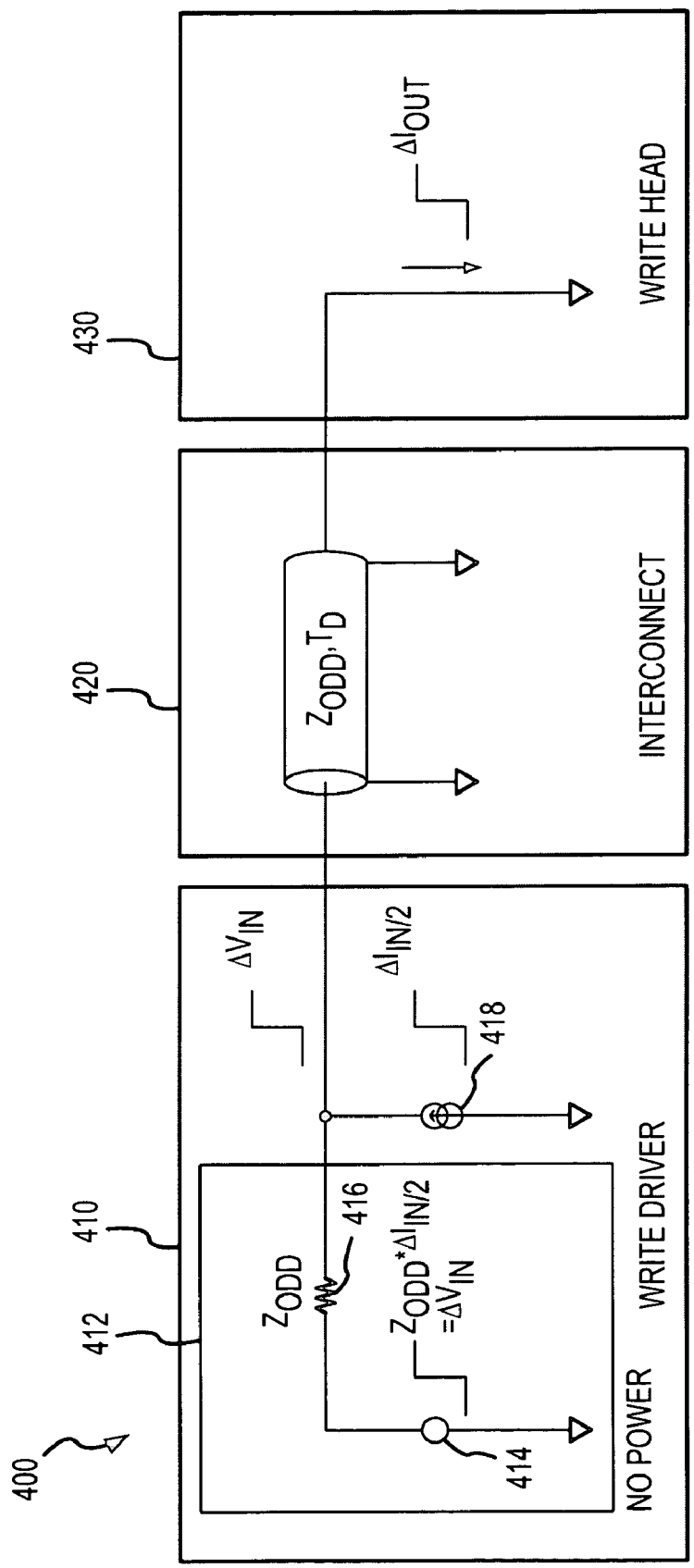
FIG. 4 illustrates, in a fashion similar to FIGS. 1 and 2, one embodiment of a write assembly of a HDD system, such as that of FIG. 3, with a write driver configured according to the invention.

Referring to FIG. 4, a write assembly 400 for use in HDD systems, such as system 300 of FIG. 3, is illustrated that provides significant advantages over the circuits 110, 210 of FIGS. 1 and 2. The write assembly 400 comprises a write driver 410 that functions to provide an output current, $\Delta I_{OUT}$, that drives a write head 430. The write driver 410 is linked to the head 430 with an interconnect 420, such as a flexible transmission line, that is characterized by an impedance, $Z_{ODD}$, and a signal transmission delay, $T_D$. According to one feature of the invention, the output impedance is set within an impedance matching circuit 412 to be equal to the impedance, $Z_{ODD}$, in the interconnect 420. While other components may be utilized to set such impedance, the illustrated circuit 412 utilizes a resistor 416 to set the output impedance of the write driver 410.

Additionally, within the circuit 412, the internal termination of the output resistor 416 is driven by an equivalent voltage source 414 such that the voltage drop across the resistor 416 is equal to about zero during the period of twice the transmission delay, $2T_D$, seconds, after the beginning of the transition. A current source 418 is also provided in the write driver 410 that is selected such that the write driver 410 advantageously generates a "current amplification effect" on the load side, i.e., at the write head 430. The current amplification effect can be seen as the output current step, $\Delta I_{OUT}$, is twice the source current step, $\Delta I_{IN}/2$, created by the current source 418. The voltage drop on the write driver 410 output resistance or resistor 416 is made equal to zero, and as a result, no current is flowing through the parallel path. Therefore, no power is supplied by the voltage source for the period of the first $2T_D$ of the transition. This fact together with the amplification effect account for the gain of two in power supplied by the write driver source 414 for the period of the first $2T_D$ when compared to the "matched" circuit 210 of FIG. 2. The write driver 410, as discussed above, always has matched impedance with the interconnect 420, thereby avoiding the propagation of reflected waves from the head 430, such as after $2T_D$ from the beginning of a transition, and also shows a clean output step response, $\Delta I_{OUT}$, to the input step, $\Delta I_{IN}/2$.

Figure 5:
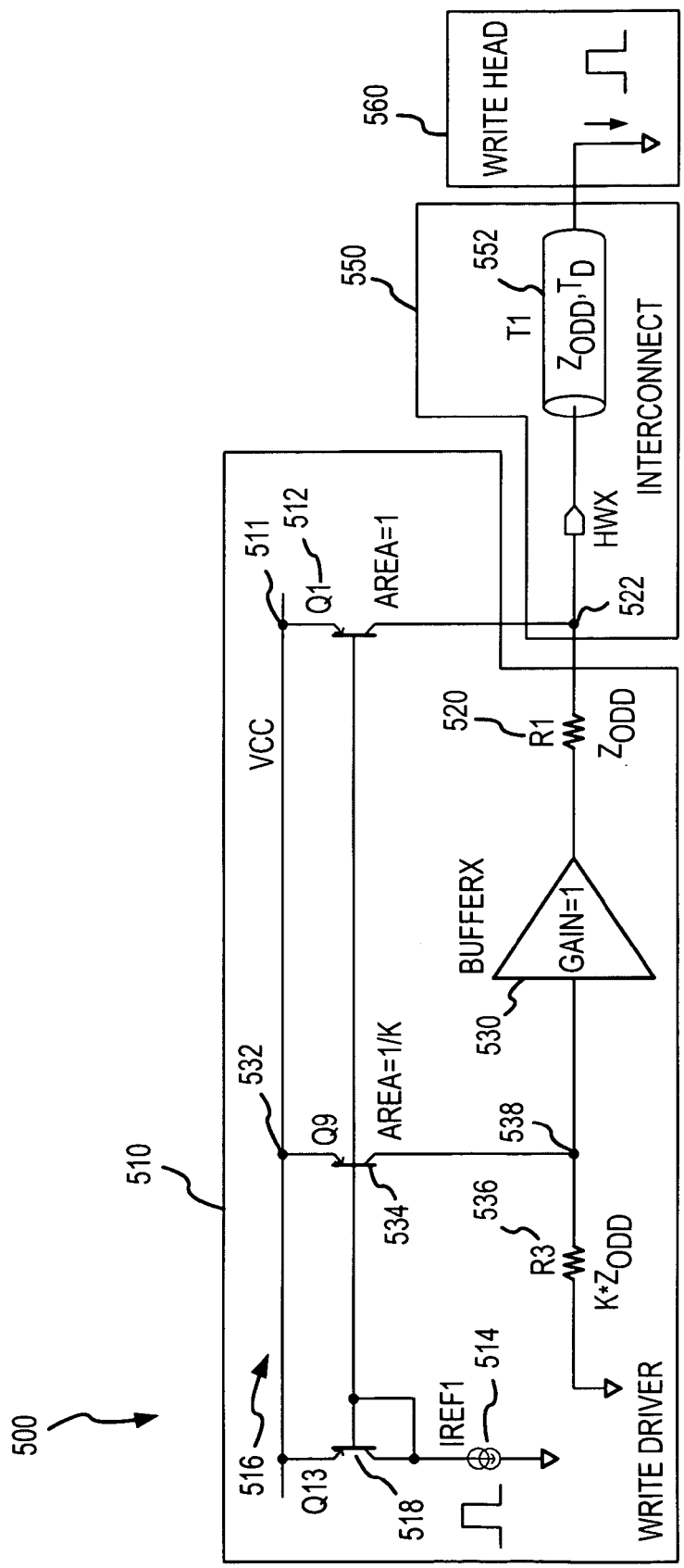
FIG. 5 is another illustration of a write assembly according to the present invention providing a more detailed schematic illustration of the circuitry of the write driver.

FIG. 5 illustrates another embodiment of a write assembly 500 providing a more detailed circuital implementation of a write driver 510 according to the invention. The write assembly 500 includes a write head 560 linked to a write driver 510 with an interconnect 550. The interconnect 550 is connected to the write head 560 at node 522 at which point write head 510 provides output voltage, HWX, and includes transmission line 552 with a characteristic odd impedance, $Z_{ODD}$, and which delays propagated signals by a transmission delay, $T_D$.

In write driver 510, transistor Q1 512 is connected at node 511 to current mirror 516, and the transistor Q1 512 functions as a current generator, e.g., similar to source 418 of FIG. 4, to produce the current step, $\Delta I_{IN}/2$. The amplitude of the current step (i.e., $\Delta I_{IN}/2$) of the pulsed current generated by transistor Q1 512 is set by a reference current generator $I_{REF1}$ 514 and by the ratio of current mirror 516, which includes transistors Q9, Q13 shown at 534 and 524, respectively. A resistor 520 is included in the write head 510 to set the circuit output impedance and is selected to provide matched impedance with the transmission line 552 of interconnect 550. In this regard, the resistor 520 is selected such that its resistance, R1, is equal to the odd characteristic impedance of the line, T1, 552, i.e., $R1=Z_{ODD}$ where $Z_{ODD}=Z_O/2$.

A voltage source to provide a desired input voltage (i.e., $\Delta V_{IN}$ as in FIG. 4) is implemented in the write driver 510 with a buffer 530, i.e., Buffer X, transistor Q9 534, and resistor 536. The buffer 530 preferably is designed to have unity gain and low output impedance and high input impedance relative to the odd characteristic impedance, $Z_{ODD}$, of the interconnect 550. Due to the high input impedance of the buffer 530, the resistance, R3, of the resistor 536 can be scaled relative to the impedance of the transmission line 552, such as K times larger than $Z_{ODD}$. This also allows the area of transistor Q9 534 to be much smaller than the transistor Q1 512, such as K times smaller.

The voltage step, generated at the input and output of the unity gain buffer 530 can be determined as follows:

$$\Delta V_{IN}=K \cdot Z_{ODD} \cdot (\Delta I_{IN}/2K)=(Z_{ODD} \cdot \Delta I_{IN})/2$$

As a result, the voltage step, $\Delta V_{IN}$, is equal to the output voltage, HWX, of the driver 510 to the interconnect 550 on node 522. Further, neglecting the bias of the buffer 530, the power consumption during the transition is given by the following formula:

$$POWER=(\Delta I_{OUT}^2 \cdot Z_{ODD})/2) \cdot (\frac{1}{2}+1/(2K))$$

The latter bracketed term represents the power consumption saved by using the circuit of the write driver 510 relative to the write driver 212 of FIG. 2. The power consumption formula shows that a power saving of one half plus a term that can be made arbitrarily small by increasing the scaling factor K, i.e., a power saving of about 50 percent is readily achieved with the write driver 510 of FIG. 5. Since the output impedance of the buffer 530 is kept low compared with the odd characteristic impedance, $Z_{ODD}$, of the interconnect line 552 for all of the duration of the transient, the output impedance of the circuit of the write driver 510 is equal to $Z_{ODD}$, and is, therefore, impedance matched with the line 552.

Figure 6:
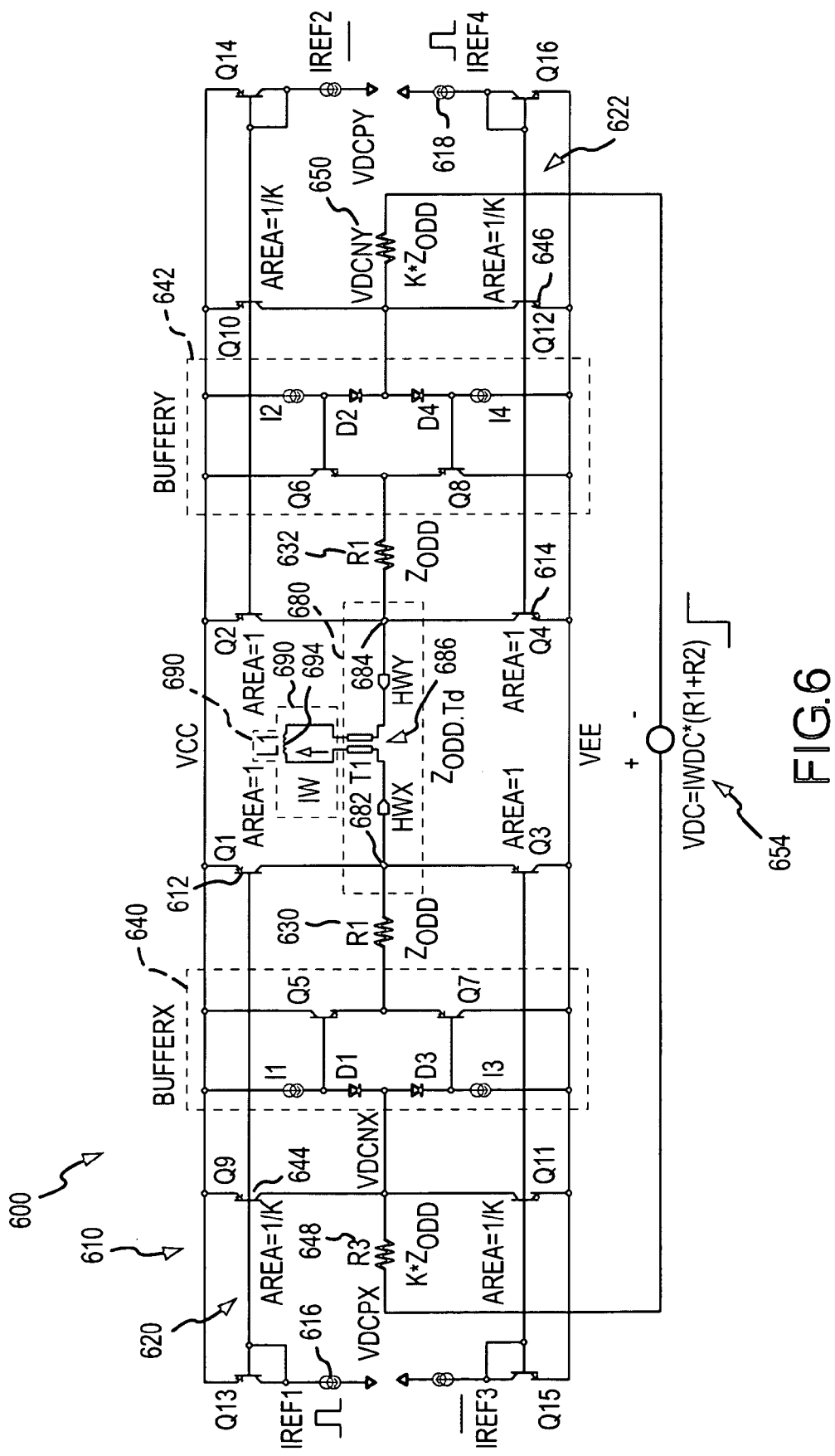
FIG. 6 illustrates one circuital implementation of the write assembly of the the present invention showing an H-bridge embodiment of the write driver according to the invention.

FIG. 6 illustrates in more detail a write assembly 600 for use in HDD systems such 300 of FIG. 3. As shown, the write assembly 600 is a fully differential circuital implementation of the single ended embodiment shown in FIGS. 4 and 5. The write assembly 600 includes a write driver 610, connected at nodes 682, 684 to interconnect 680 to apply output voltages, HWX and HWY, to transmission line(s) 686. The interconnect 680 provides the electrical connection between the write driver 610 and a write head 690 with coil 694 through which an output or write current, $I_W$, is driven by operation of write driver 610.

In the write driver 610, the transistors Q1, Q4 shown as elements 612, 614 act like pulsed current generators to provide source current, $\Delta I_{IN}/2$. The amplitude (i.e., $I_{OS}$) of the pulsed current generated by transistors 612, 614 is decided by the reference current generators 616, 618 labeled $I_{REF1}$ and $I_{REF2}$ and by the ratios of current mirrors 620, 622, which may be set to one for simplicity. The resistors 630, 632 set the output impedance of the write driver 610 and chosen such that the resistances R1, R2 of the resistors 630, 632 are equal to the odd characteristic impedance of the transmission line 686 of the interconnect 680, i.e., $R1=R2=Z_{ODD}=Z_O/2$.

The voltage source (e.g., $\Delta V_{IN}$ in FIG. 4) of the write driver 610 is differentially implemented by the buffers 640, 642 (labeled Buffer X and Buffer Y), transistors 644, 646 (labeled Q9 and Q12), and resistors 648, 650 (with resistances R3 and R4). The gain in power consumption in the write driver 610 is obtained with K-scaling (as in assemblies 400 and 500 of FIGS. 4 and 5) of transistors 644, 646 and resistors 648, 650 with respect to the output devices.

The steady state current, $I_{WDC}$, into the head coil 694 is set by a differential switched controlled voltage source 654 (i.e., $V_{DC}=I_{WDC} \cdot Z_{ODD}$) connected at the nodes VDCPX, VDCPY as shown. Neglecting the bias of buffers 640, 642, the power consumption during the first $2T_D$ seconds after the beginning of the transition is given by the following formula:

$$POWER=((2 \cdot I_{OS})^2 \cdot Z_O)/2) \cdot (\frac{1}{2}+1/(2K))$$

In this formula, $Z_O=2 \cdot Z_{ODD}$ is the characteristic impedance of the line 686 in the interconnect 680 and $2 \cdot I_{OS}$ is the $\Delta I_{OUT}$ above the steady state current on the head 690.

Figure 7:
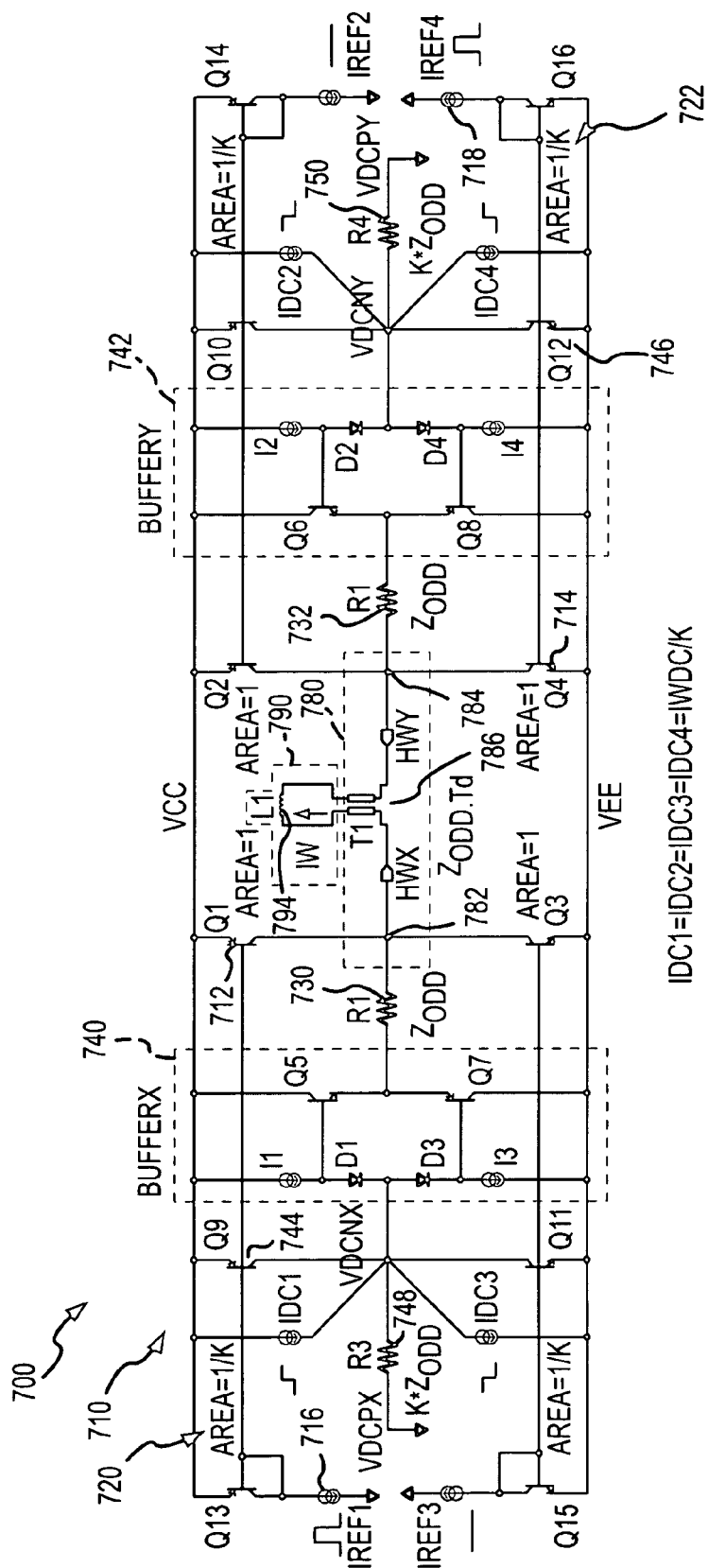
FIG. 7 illustrates another circuital implementation of the write assembly of the invention showing an alternative technique of setting steady state current into the write head.

FIG. 7 illustrates an assembly 700 similar to that of assembly 600 of FIG. 6 except that the steady state current, $I_{WDC}$, into the head coil 794 of head 790 is set by four Norton equivalent switched current generators ($I_{DC}=I_{WDC}/K$) connected between the supplies and the terminals, VDCNX, VDCNY, with the terminals, VDCPX, VDCPY, connected to the common mode ground as shown.

Further, as shown, the write assembly 700 is a fully differential circuital implementation of the single ended embodiment shown in FIGS. 4 and 5. The write assembly 700 includes a write driver 710 connected at nodes 782, 784 to interconnect 780 to apply output voltages, HWX and HWY, to transmission line(s) 786. The interconnect 780 provides the electrical connection between the write driver 710 and a write head 790 with coil 794 through which an output or write current, $I_W$, is driven by operation of write driver 710. The transistors Q1, Q4 shown as elements 712, 714 act like pulsed current generators to provide source current, $\Delta I_{IN}/2$. The amplitude (i.e., $I_{OS}$) of the pulsed current generated by transistors 712, 714 is decided by the reference current generators 716, 718 labeled $I_{REF1}$ and $I_{REF2}$ and by the ratios of current mirrors 720, 722, which may be set to one for simplicity. The resistors 730, 732 set the output impedance of the write driver 710 and chosen such that the resistances R1, R2 of the resistors 730, 732 are equal to the odd characteristic impedance of the transmission line 786 of the interconnect 780, i.e., $R1=R2=Z_{ODD}=Z_O/2$. The voltage source (e.g., $\Delta V_{IN}$ in FIG. 4) of the write driver 710 is differentially implemented by the buffers 740, 742 (labeled Buffer X and Buffer Y), transistors 744, 746 (labeled Q9 and Q12), and resistors 748, 750 (with resistances R3 and R4). The gain in power consumption in the write driver 710 is obtained with K-scaling (as in assemblies 400 and 500 of FIGS. 4 and 5) of transistors 744, 746 and resistors 748, 750 with respect to the output devices.

Figure 8:
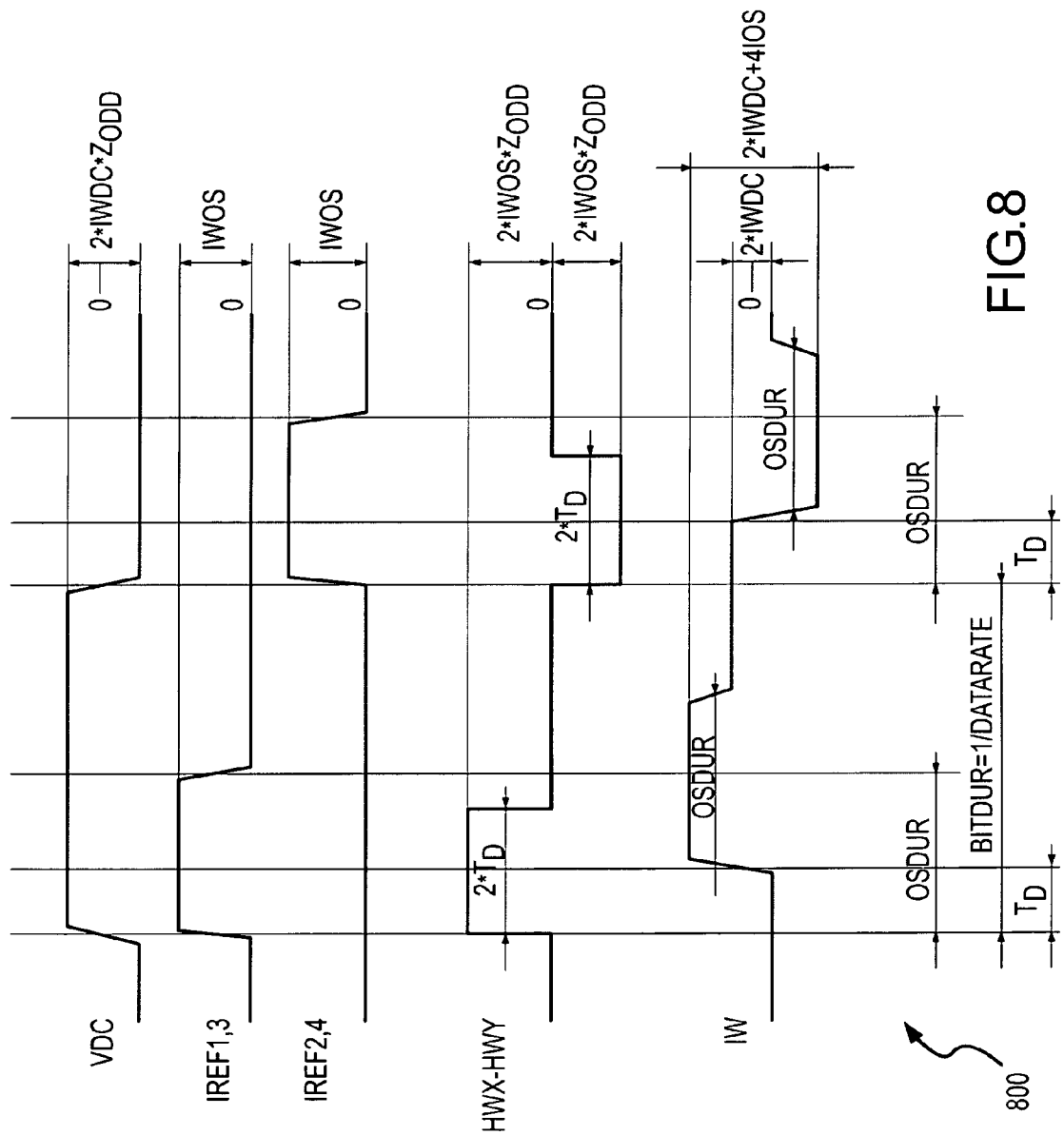
FIG. 8 is a time diagram for the write driver of FIG. 6.

FIG. 8 provides a time diagram 800 for the write assembly 600 and write driver 610 shown in FIG. 6. The time diagram shows the control signals, the write driver differential output, and the head current when a sequence of one positive and one negative pulse are driven at the full data rate (e.g., BITDUR=1/DATARATE). For this particular case, the duration of the current pulse generated by reference current generators 616, 618 (labeled $I_{REF1}$, $I_{REF2}$), which set the duration, OSDUR, of the overshoot in the head current, is set longer than $2T_D$, where $T_D$ is the electrical length of the interconnect line 686. The main reflection generated at the head side at $T_D$ seconds after the beginning of the transition is completely absorbed by the matched write driver 610 at time $2T_D$, and no other reflections propagate after $2T_D$ seconds, which results in a clean head current step response. In general, because the write driver 610 is impedance matched with the interconnect 680 at any time, the duration of the overshoot in the head current, OSDUR, can be set to any value starting from 0 seconds to BITDUR seconds.

Figure 9:
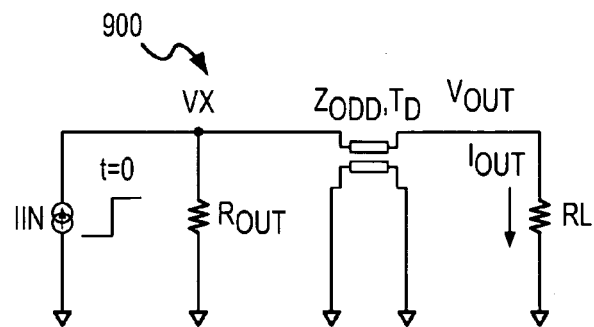
FIG. 9 is a circuit drawing useful for analyzing signal propagation through an interconnect line in response to a Norton equivalent step generator.

The following is a description of an analysis of the prior art systems of FIGS. 1 and 2 along with HDD systems implementing a write driver according to the present invention. The analysis is based on signal propagation and provides a new useful classification technique. FIG. 9 illustrates a simplified write assembly circuit 900 that facilitates analysis of signal propagation through an interconnect line in response to a Norton equivalent step generator.

If the source step starts at t=0 it's possible to define:

$\Delta I_{IN} = I_{IN}(t=0^+) - I_{IN}(t=0^-)$ $\Delta V_X = V_X(t=0^+) - V_X(t=0^-)$ $\Delta V_{OUT} = V_{OUT}(t=0^+) - V_{OUT}(t=0^-)$ $\Delta I_{OUT} = I_{OUT}(t=0^+) - I_{OUT}(t=0^-)$ The following formula governs the signal propagation:

$$\Delta V_{OUT} = \underbrace{\underbrace{(\Delta I_{IN} R_{OUT}) \cdot \frac{Z_{ODD}}{R_{OUT} + Z_{ODD}}}_{\Delta V_X} \cdot \frac{2 \cdot R_L}{R_L + Z_{ODD}}}_{\Delta V_{OUT}} \cdot \underbrace{\frac{1}{R_L}}_{\Delta I_{OUT}} \quad \text{EQ. 1}$$

for $R_L \ll Z_{ODD}$

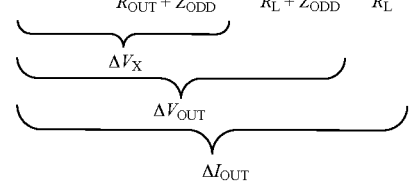

$$\Delta V_X = (\Delta I_{IN} \cdot R_{OUT}) \cdot \frac{Z_{ODD}}{R_{OUT} + Z_{ODD}} \quad \begin{array}{l} R_{OUT} = 0 \to = 0 \\ R_{OUT} = Z_{OUT} \to = \frac{\Delta I_{IN} \cdot Z_{ODD}}{2} \\ R_{OUT} = \infty \to = \Delta I_{IN} \cdot Z_{ODD} \end{array}$$

Figure 10:
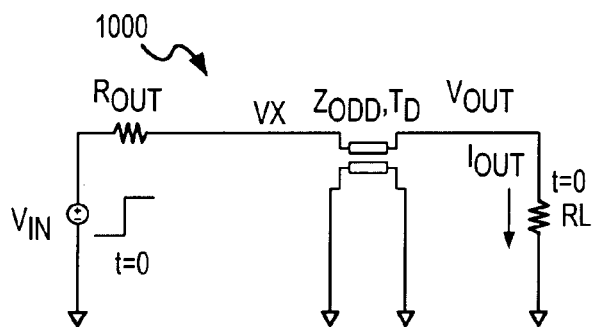
FIG. 10 is a circuit drawing useful for analyzing signal propagation through an interconnect line in response to a Thevenin equivalent step generator.

FIG. 10 illustrates a simplified write assembly circuit 1000 that facilitates analysis of signal propagation through an interconnect line in response to a Thevenin equivalent step generator.

If the source step starts at t=0 it's possible to define:

$\Delta V_{IN} = V_{IN}(t=0^+) - V_{IN}(t=0^-)$ $\Delta V_X = V_X(t=0^+) - V_X(t=0^-)$ $\Delta V_{OUT} = V_{OUT}(t=0^+) - V_{OUT}(t=0^-)$ $\Delta I_{OUT} = I_{OUT}(t=0^+) - I_{OUT}(t=0^-)$ The following formula governs the signal propagation:

$$\Delta I_{OUT} = \underbrace{\underbrace{(\Delta V_{IN}) \cdot \frac{Z_{ODD}}{R_{OUT} + Z_{ODD}}}_{\Delta V_X} \cdot \frac{2 R_L}{R_L + Z_{ODD}}}_{\Delta V_{OUT}} \cdot \underbrace{\frac{1}{R_L}}_{} \quad \text{EQ. 2}$$

for $R_L \ll Z_{ODD}$ $$\Delta I_{OUT} = (\Delta V_{IN}) \cdot \frac{Z_{ODD}}{R_{OUT} + Z_{ODD}} \cdot \begin{array}{ll} R_{OUT} = 0 \to = 2 \cdot \frac{\Delta V_{IN}}{Z_{ODD}} & \text{CLASS 4} \\ R_{OUT} = Z_{ODD} \to = \frac{\Delta V_{IN}}{Z_{ODD}} & \text{CLASS 5} \\ R_{OUT} = \infty \to = 0 & \text{CLASS 6} \end{array}$$

-continued $$\Delta V_X = (\Delta I_{IN} \cdot R_{OUT}) \cdot \frac{Z_{ODD}}{R_{OUT} + Z_{ODD}} = \begin{array}{l} R_{OUT} = 0 \rightarrow = \Delta V_{IN} \\ R_{OUT} = Z_{OUT} \rightarrow = \frac{\Delta V_{IN}}{2} \\ R_{OUT} = \infty \rightarrow = 0 \end{array}$$

Figure 11:
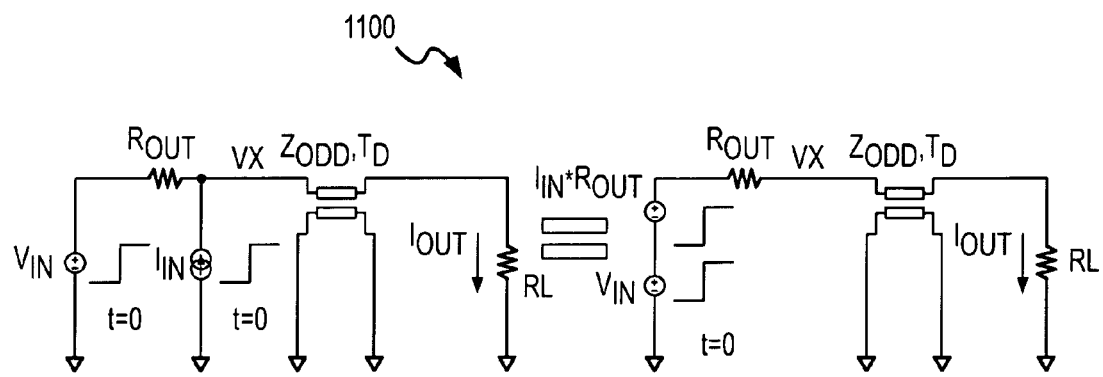
FIG. 11 is a circuit drawing useful for analyzing signal propagation through an interconnect line in response to superimposition of Norton and Thevenin equivalent step generators.

FIG. 11 illustrates a simplified write assembly circuit 1100 that facilitates analysis of signal propagation through an interconnect line in response to a superimposition of Norton and Thevenin equivalent step generators.

If the source step starts both at t=0 it's possible to define:

$$\Delta V_{IN} = V_{IN}(t=0^+) - V_{IN}(t=0^-)$$

$$\Delta I_{IN} = I_{IN}(t=0^+) - I_{IN}(t=0^-)$$

$$\Delta V_x = V_x(t=0^+) - V_x(t=0^-)$$

$$\Delta V_{OUT} = V_{OUT}(t=0^+) - V_{OUT}(t=0^-)$$

$$\Delta I_{OUT} = I_{OUT}(t=0^+) - I_{OUT}(t=0^-)$$

The following formula governs the signal propagation:

$$\Delta I_{OUT} = \underbrace{\underbrace{(\Delta V_{IN} + \Delta I_{IN} R_{OUT}) \cdot \frac{Z_{ODD}}{R_{OUT} + Z_{ODD}}}_{\Delta V_X} \cdot \frac{2 \cdot R_L}{R_L + Z_{ODD}}}_{\Delta V_{OUT}} \cdot \frac{1}{R_L} \quad \text{EQ. 3}$$

for $R_L \ll Z_{ODD}$ and for $\Delta V_{IN} = \Delta I_{IN} * R_{OUT}$ $$\Delta I_{OUT} = (2 \Delta I_{IN} \cdot R_{OUT}) \cdot \frac{Z_{ODD}}{R_{OUT} + Z_{ODD}} \cdot \frac{2}{Z_{ODD}} = \begin{array}{l} R_{OUT} = 0 \rightarrow = 2 \cdot \Delta I_{IN} \quad \text{CLASS 7} \\ R_{OUT} = Z_{ODD} \rightarrow = 2 \cdot \Delta I_{IN} \quad \text{CLASS 8} \\ R_{OUT} = \infty \rightarrow = 2 \cdot \Delta I_{IN} \quad \text{CLASS 9} \end{array}$$

$$\Delta V_X = (2 \cdot \Delta I_{IN} \cdot R_{OUT}) \cdot \frac{Z_{ODD}}{R_{OUT} + Z_{ODD}} = \begin{array}{l} R_{OUT} = 0 \rightarrow = \Delta I_{IN} \cdot Z_{ODD} \\ R_{OUT} = Z_{OUT} \rightarrow = \Delta I_{IN} \cdot Z_{ODD} \\ R_{OUT} = \infty \rightarrow = \Delta I_{IN} \cdot Z_{ODD} \end{array}$$

The above analysis with reference to FIGS. 9–11 facilitates classification of write assemblies or more specifically, write drivers for HDD systems into classes based on power consumption and impedance matching with the interconnect. In the following nine classes previously introduced are reclassified in terms of power consumption and impedance matching condition.

| CLASS | Power Consumption* | Impedance matching | New Classification |
|---|---|---|---|
| 1 | Infinite | unmatched | — |
| 2 | $\Delta I_{OUT}^2 * Z_{ODD}/2$ | matched | SOLUTION2 |
| 3 | $\Delta I_{OUT}^2 * Z_{ODD}/4$ | unmatched | SOLUTION1 |
| 4 | $\Delta I_{OUT}^2 * Z_{ODD}/4$ | unmatched | SOLUTION1 |
| 5 | $\Delta I_{OUT}^2 * Z_{ODD}/2$ | matched | SOLUTION2 |
| 6 | Infinite | unmatched | — |
| 7 | $\Delta I_{OUT}^2 * Z_{ODD}/4$ | unmatched | SOLUTION1 |
| 8 | $\Delta I_{OUT}^2 * Z_{ODD}/4$ | matched | SOLUTION3 |
| 9 | $\Delta I_{OUT}^2 * Z_{ODD}/4$ | unmatched | SOLUTION1 |

*Power Consumption of the driver for the first 2 * Td after the beginning of the transition.

In the above table, "matched" means ROUT equals $Z_{ODD}$ and "unmatched" means $R_{OUT}$ not equal to $Z_{ODD}$. CLASS 1 and CLASS 6 are not reclassified because they do not represent a profitable way to drive and are not used in any prior art known.

With the new method of classification only three new classes are created out of the initial nine. Among these three, SOLUTION 1 and SOLUTION 2 group the equivalent circuit of the prior known circuits of FIGS. 1 and 2 in at least one of their constituent parts. Significantly, SOLUTION 3 is the class of the present invention equivalent circuit as shown in FIGS. 4–7. The write drivers of the invention provide the only class that concurrently achieves minimum power consumption (i.e., optimized power) and the impedance matching condition.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention as hereinafter claimed.

We claim:

1. A write driver for driving a write current through a write head, the write driver being coupled to the write head by an interconnect having an odd characteristic impedance, the write driver comprising:
   a first resistor coupled to a driving terminal for matching an output impedance of the write driver to the odd characteristic impedance of the interconnect;
   a buffer amplifier having an input, and an output coupled to the first resistor;
   a second resistor coupled between the input of the buffer amplifier and a reference potential, the second resistor being equal in value to the first resistor multiplied by a scaling factor; and
   a current mirror having an input for receiving an input current, a first current output coupled to the input of the buffer amplifier, the first current output being equal in value to the input current divided by the scale factor, and a second current output being coupled to the driving terminal.

2. The write driver of claim 1 wherein the reference potential comprises ground.

3. The write driver of claim 1 wherein the current mirror comprises a P-type current mirror.

4. A write driver for driving a write current through a write head, the write driver being coupled to the write head by an interconnect having an odd characteristic impedance, the write driver comprising:

a first resistor coupled to a driving terminal for matching an output impedance of the write driver to the odd characteristic impedance of the interconnect;

a buffer amplifier having an input, and an output coupled to the first resistor;

a second resistor coupled between the input of the buffer amplifier and a reference potential, the second resistor being equal in value to the first resistor multiplied by a scaling factor;

a first current mirror having an input for receiving an input current, a first current output coupled to the input of the buffer amplifier, the first current output being equal in value to the input current divided by the scale factor, and a second current output being coupled to the driving terminal; and a second current mirror having an input for receiving an input current, a first current output coupled to the input of the buffer amplifier, the first current output being equal in value to the input current divided by the scale factor, and a second current output being coupled to the driving terminal.

5. The write driver of claim 4 wherein the reference potential comprises ground.

6. The write driver of claim 4 wherein the first current mirror comprises a P-type current mirror.

7. The write driver of claim 4 wherein the second current mirror comprises an N-type current mirror.

8. A write driver for driving a write current through a write head, the write driver being coupled to the write head by an interconnect having an odd characteristic impedance, the write driver comprising:

a first resistor coupled to a first driving terminal for matching an output impedance of the write driver to the odd characteristic impedance of the interconnect;

a first buffer amplifier having an input, and an output coupled to the first resistor;

a second resistor coupled between the input of the first buffer amplifier and a reference potential, the second resistor being equal in value to the first resistor multiplied by a scaling factor;

a first current mirror having an input for receiving a first input current, a first current output coupled to the input of the first buffer amplifier, the first current output being equal in value to the first input current divided by the scale factor, and a second current output being coupled to the first driving terminal;

a second current mirror having an input for receiving a second input current, a first current output coupled to the input of the first buffer amplifier, the first current output being equal in value to the second input current divided by the scale factor, and a second current output being coupled to the driving terminal;

a third resistor coupled to a second driving terminal for matching the output impedance of the write driver to the odd characteristic impedance of the interconnect;

a second buffer amplifier having an input and an output coupled to the third resistor;

a fourth resistor coupled between the input of the second buffer amplifier and the reference potential, the fourth resistor being equal in value to the third resistor multiplied by the scaling factor;

a third current mirror having an input for receiving a third input current, a first current output coupled to the input of the second buffer amplifier, the first current output being equal in value to the third input current divided by the scale factor, and a second current output being coupled to the second driving terminal; and a fourth current mirror having an input for receiving a second input current, a first current output coupled to the input of the second buffer amplifier, the first current output being equal in value to the second input current divided by the scale factor, and a second current output being coupled to the second driving terminal.

9. The write driver of claim 8 wherein the reference potential comprises ground.

10. The write driver of claim 8 wherein the first current mirror comprises a P-type current mirror.

11. The write driver of claim 8 wherein the second current mirror comprises an N-type current mirror.

12. The write driver of claim 8 wherein the third current mirror comprises a P-type current mirror.

13. The write driver of claim 8 wherein the fourth current mirror comprises an N-type current mirror.

14. The write driver of claim 8 further comprising a first bias current coupled to the input of the first buffer amplifier.

15. The write driver of claim 8 further comprising a second bias current coupled to the input of the first buffer amplifier.

16. The write driver of claim 8 further comprising a third bias current coupled to the input of the second buffer amplifier.

17. The write driver of claim 8 further comprising a fourth bias current coupled to the input of the second bias amplifier.

18. A write driver for driving a write current through a write head, the write driver being coupled to the write head by an interconnect having an odd characteristic impedance, the write driver comprising:

a first resistor coupled to a first driving terminal for matching an output impedance of the write driver to the odd characteristic impedance of the interconnect;

a first buffer amplifier having an input and an output coupled to the first resistor;

a second resistor coupled to the input of the first buffer amplifier and a first bias node, the second resistor being equal in value to the first resistor multiplied by a scaling factor;

a first current mirror having an input for receiving a first input current, a first current output coupled to the input of the first buffer amplifier, the first current output being equal in value to the first input current divided by the scale factor, and a second current output being coupled to the first driving terminal;

a second current mirror having an input for receiving a second input current, a first current output coupled to the input of the first buffer amplifier, the first current output being equal in value to the second input current divided by the scale factor, and a second current output being coupled to the driving terminal;

a third resistor coupled to a second driving terminal for matching the output impedance of the write driver to the odd characteristic impedance of the interconnect;

a second buffer amplifier having an input and an output coupled to the third resistor;

a fourth resistor coupled between the input of the second buffer amplifier and a second bias node, the fourth resistor being equal in value to the third resistor multiplied by the scaling factor;

a third current mirror having an input for receiving a third input current, a first current output coupled to the input of the second buffer amplifier, the first current output being equal in value to the third input current divided by the scale factor, and a second current output being coupled to the second driving terminal;

a fourth current mirror having an input for receiving a second input current, a first current output coupled to the input of the second buffer amplifier, the first current output being equal in value to the second input current divided by the scale factor, and a second current output being coupled to the second driving terminal; and a source of DC bias voltage coupled between the first and second bias nodes.

19. The write driver of claim 18 wherein the first current mirror comprises a P-type current mirror.

20. The write driver of claim 18 wherein the second current mirror comprises an N-type current mirror.

21. The write driver of claim 18 wherein the third current mirror comprises a P-type current mirror.

22. The write driver of claim 18 wherein the fourth current mirror comprises an N-type current mirror.

* * * * *